Feb. 10, 1959  C. L. MADDEN  2,872,880
FLAT DECK CONVEYANCES
Filed July 27, 1953  4 Sheets-Sheet 1

*INVENTOR.*
CHARLES L. MADDEN
BY

Feb. 10, 1959　　　C. L. MADDEN　　　2,872,880
FLAT DECK CONVEYANCES
Filed July 27, 1953　　　　　　　　　　4 Sheets-Sheet 2

INVENTOR.
CHARLES L. MADDEN
BY
H. F. Woodward
atty

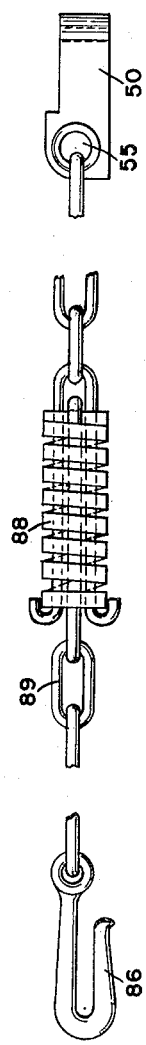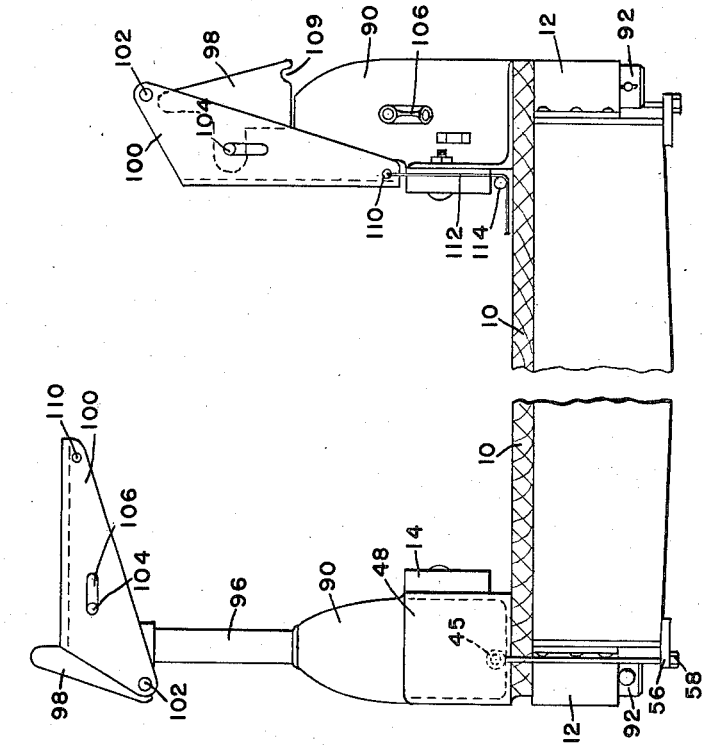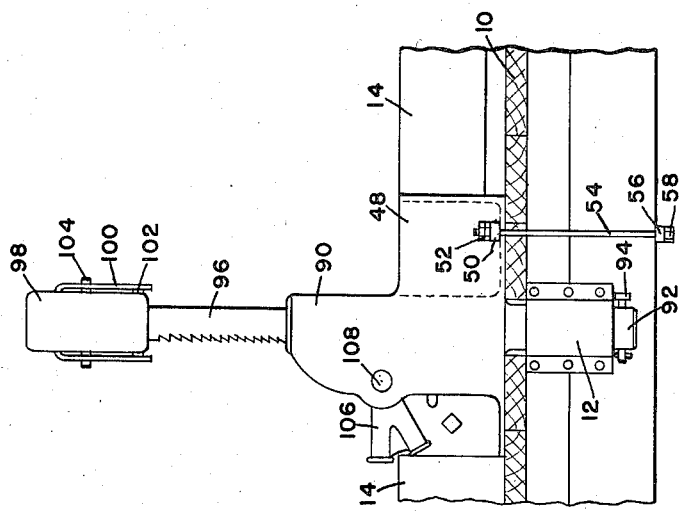

Feb. 10, 1959
C. L. MADDEN
2,872,880
FLAT DECK CONVEYANCES
Filed July 27, 1953
4 Sheets-Sheet 4
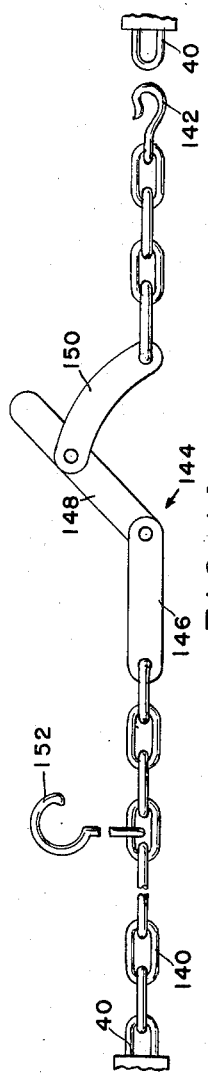
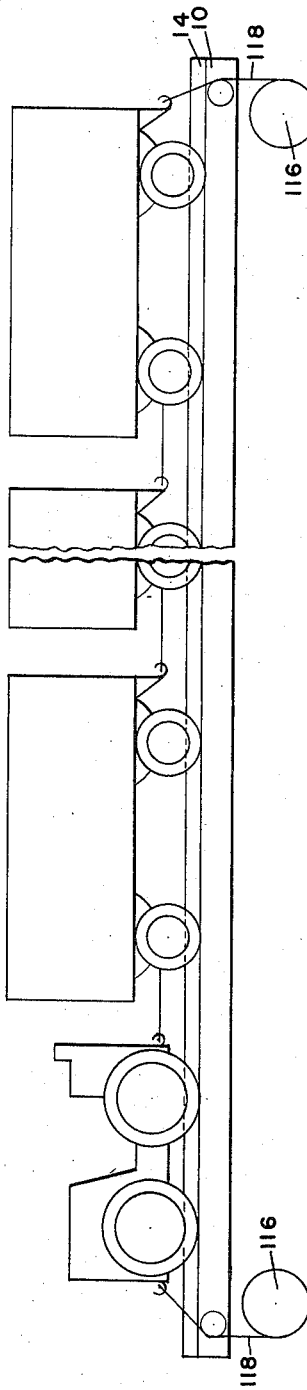
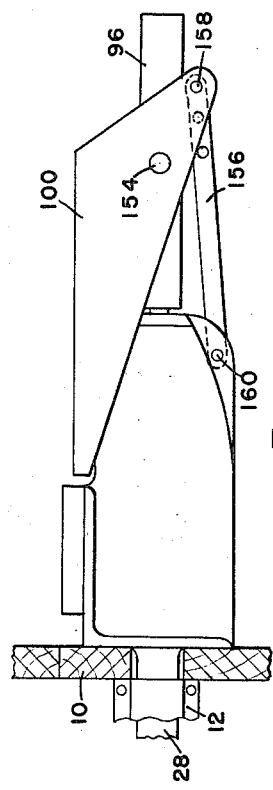
INVENTOR.
CHARLES L. MADDEN
BY H. F. Woodward
atty.

United States Patent Office 2,872,880
Patented Feb. 10, 1959

2,872,880

FLAT DECK CONVEYANCES

Charles L. Madden, Minneapolis, Minn.

Application July 27, 1953, Serial No. 370,329

4 Claims. (Cl. 105—368)

The present invention relates to flat deck conveyances provided with specific details of construction adapting them for transporting road vehicles and other merchandise. Many reasons exist for hauling road vehicles between cities by rail rather than over the highways. Weight and length limitations imposed by the laws of various States limit the type of load that may be transported over the road.

The invention more specifically relates to apparatus for transporting of automotive and other road vehicles therefor, and more particularly to means for loading and securing road vehicles such as automotive equipment on railroad cars for transporting them thereon and for removing such vehicles from said railroad cars.

One of the objects of the present invention is to provide novel apparatus whereby trailers and automobiles may be transported particularly over long distances with a minimum of expense and with a minimum of handling, said apparatus so constructed so as to be relatively inexpensive, durable, and readily installed on and removable from standard railroad equipment.

In transportation of merchandise by railway the usual procedure has been to load the same into road vehicles for conveyance to a railway station when the merchandise is again handled and transferring the load to railway cars. At the destination the same operations are repeated in reverse. These operations require the employment of personnel which is unnecessary when the present invention is used.

It is accordingly an object of the invention to provide novel means whereby the noted disadvantages and objections to the present modes of transportation are overcome.

Another object of the present invention is to provide standard railway cars with specific details of construction adapting such cars for the transportation of trailers and automobiles without interferring with the usual use of such cars.

An additional object of the invention is to provide standard railway cars with equipment whereby road vehicles may be loaded on and removed from a railway car with the minimum of personnel with utmost ease and rapidity.

It has been proposed heretofore to transport automotive equipment on railway cars but such proposals have involved the provision of complicated mechanisms, specially made railway rolling stock, special equipment and loading platform. Additional apparatus heretofore provided for securing vehicles of this nature on railway cars have not been practical and reliable and have not been such as to insure the safe transportation of goods and equipment.

Other and further objects of the invention and the advantages of the same will be pointed out hereinafter and indicated in the appended claims or will be obvious to one skilled in the art upon understanding the present disclosures.

In the drawings, wherein like reference characters refer to like parts throughout the several views:

Figure 9 is a view of a chain hold down and part of a hold down device with parts broken away;

Figure 10 is a view of a vehicle lifting device and associated hold down pocket attached to a flat deck with parts broken away;

Figure 11 is a side view of a lifting device attached to a flat deck with parts broken away;

Figure 12 is a view from the opposite side of the lifting device from that shown in Figure 11 with parts broken away;

Figure 13 is a side view with parts broken away of highway vehicles carried by a flat deck conveyance;

Figure 14 is an automobile hold down chain with parts broken away; and

Figure 15 is a view of a modified form of jack.

Figure 1:
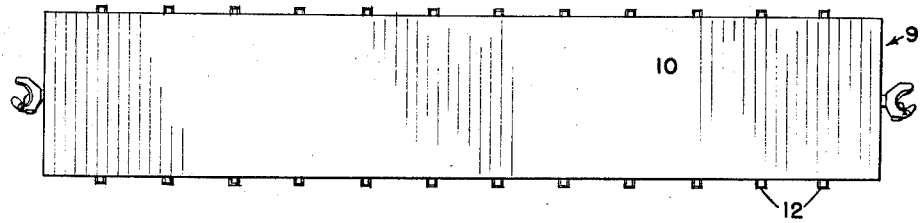
Figure 1 is a top plan view of railway flat car.
Figure 2:
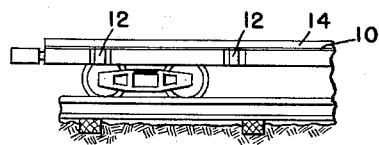
Figure 2 is a side elevational view of a flat car with portions broken away.

The equipment used according to the present invention is comparatively simple and when used with a standard railway flat car does not require such modification thereof as to in any manner interfere with the normal usages of such railway equipment. The regular flat car 9, shown in Figure 1, is provided with regular stake pockets 12.

In loading flat cars with highway vehicle equipment the vehicles are towed or driven onto the car deck at one end from a loading platform or by the use of a suitable loading ramp. At some railway stations it often occurs that the loading platforms are so placed that the railway cars must be loaded from the side.

According to the invention, it is contemplated that if highway vehicles are to be transported they may be driven onto the flat car under their own power or hauled upon the flat car by any suitable vehicle; for example, a tractor. It is to be understood that the flat cars may be coupled together by any convenient coupling means, and since the operation of placing a fleet of vehicles upon a train of flat cars necessitates that the vehicle pass from car to car. The invention comprehends the use of a novel toe board for this purpose, such toe board may be of any width but generally it is preferred that they may be about one half of the distance between coupled flat cars. The toe boards in the raised position act as stops or bumpers.

The vehicle lifting and hold down device shown in Figures 10, 11 and 12 are adapted to be placed in the normal stake pockets 12 of a flat deck conveyance such as a railway flat car. The trailer loaders forming the lifting and hold down devices quickly convert standard flat cars for efficient automotive vehicles service. These devices hold the trailers in position on the flat car. While the vehicle and load partially ride on the trailer springs, the vehicle springs are held in non-operative position by the trailer loaders. Thus the vehicle and load becomes an integral part of the flat car.

The trailer loaders are easy to use:

(1) A vehicle is moved into position on the flat car.

(2) A vehicle hold down band, chain or the like is attached to each corner.

(3) The vehicle loader support brackets are lifted into and then locked in a horizontal position.

(4) The four vehicle loader supports are raised until the hold down bands are tight.

In unloading the above procedure is reversed.

Figure 3:
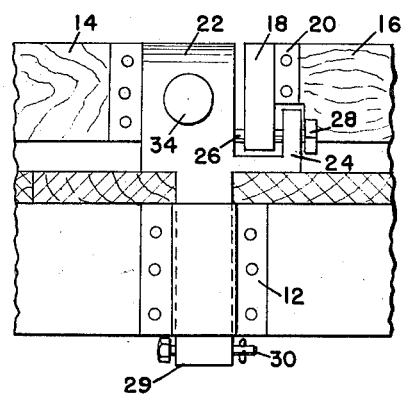
Figure 3 is a side elevational view of a flat car with portions broken away showing one stake pocket with an automobile hold down device mounted therein.

In Figure 3 is shown a section of a flat car with a stake pocket 12 and with a part of the rigidly mounted rub rail 14 replaced by a specially constructed rub rail 16. This rub rail 16 is attached to rub rail bracket 18 and secured to the special rub rail by member 20. A hold down device 22 has extension 29 which is mounted in the stake pocket 26 passes thorugh bracket 24 and the rub rail bracket 18. The rub rail 16 is pivotally mounted and can be swung to unloading and loading position. The hold down device 22 has extension 29 which is mounted in the stake pocket 12. The member 29 is held in position by a suitable pin 30 or by any other suitable means. Mounted in the hold down device is member 32 having head 34 at one end and eye 36 at the other end. Spring like member 38 is mounted in the hold down device 22 and attached to eye 36 at one end and the other end of the spring is provided with eye or cable attaching means 40 to which the hold down band or chain may be attached.

When it is desirable to unload a road vehicle from the car to a parallel extending platform, the special rub rail 16, being hingedly mounted on bracket 18, is turned so that wood ramp 42 is in such position that the car can be readily loaded or unloaded from the side of the flat car. It is to be understood that the rub rail 16 may be locked in the position shown in Figure 3 by any suitable locking means (not shown). It is to be understood that only a part of the rub rail need be hingedly mounted to permit loading of automotive devices from the side of the car. A portion of the rub rail 14, shown in Figure 3, may be (and preferably) is attached to the jack arrangement shown in Figure 10.

Figures 6, 7:
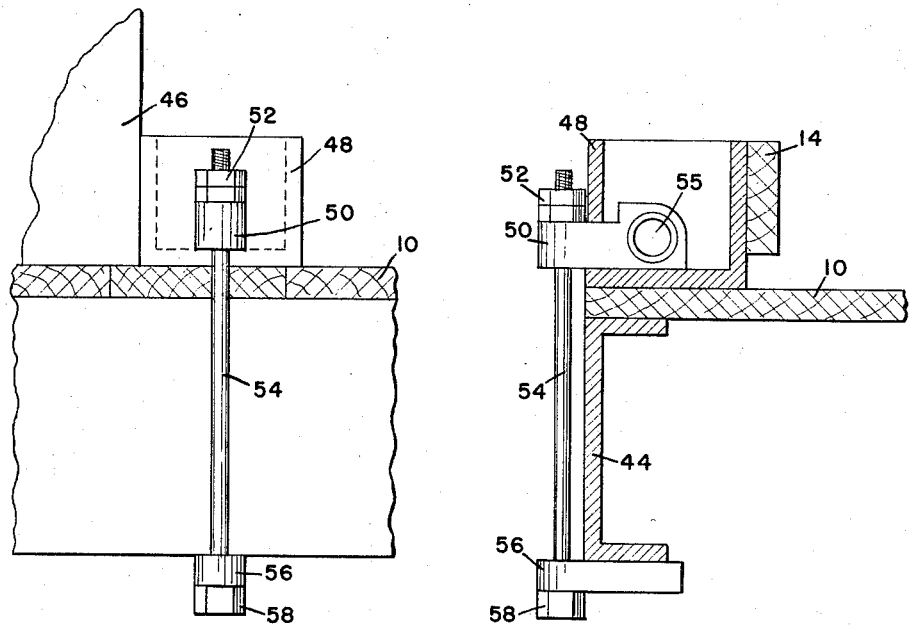
Figure 6 is a side view of a chain hold down device secured on a car with parts broken away.
Figure 7 is a sectional view through a hold down device similar to that shown in Figure 6.
Figure 8:
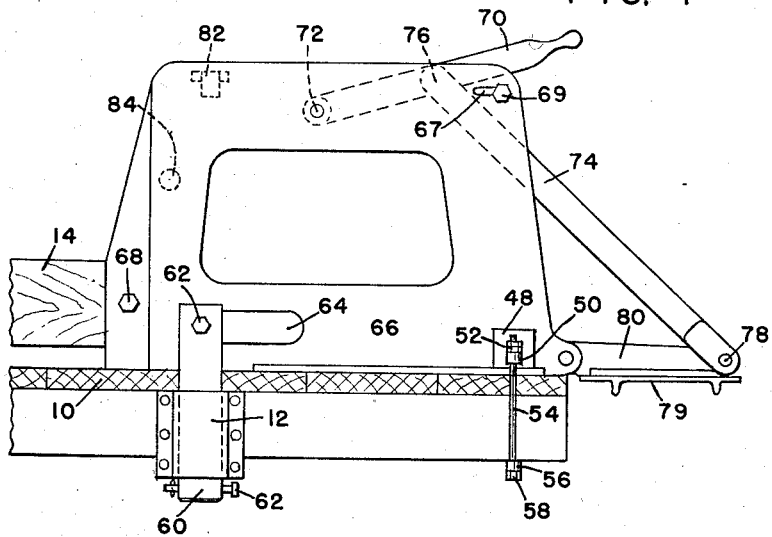
Figure 8 is a side view of a toe board lifting assembly.

In Figure 6, 46 indicates a suitable jack with a portion broken away. In the hold down container 48 there is mounted hold down member or cable attaching means 50. The member 50 is slideably mounted in 48 and is provided with an opening 55 for the reception of a band or chain. The opening 55 preferably has beveled edges so as to lessen the likelihood of cutting a band if such hold down means is used. Passing through the end of the hold down member 50 is bolt 54 which has nuts 52 secured at the upper end. The bolt 54 passes through clip 56 and the lower end of the bolt is provided with head 58.

If it is desired to load a series of flat cars the road vehicles must be driven from one car to another, to permit this to be done a toe board is provided which normally extends in a substantially vertical position from the flat deck but may be lowered to a substantially horirzontal position when the vehicles are to be loaded on the flat car or when the vehicles are to be driven from one flat car to the next. The toe board bracket 80 which supports the toe board 79 has attached thereto link 74 at 78. The other end of the link 74 is attached at 76 to lever 70. The lever 70 is mounted on frame 66 at 72. The frame 66 is attached to the rub rail 14 by suitable means 68. The frame member 66 has adjustably attached thereto member 60 which extends through the standard stake pocket 12 of a railway car 9. The member 60 is secured in place by a suitable pin 62. The lever 70 rests upon adjustable stop 69, mounted in aperture 67, when the toe board is in the lowered position. Due to the fact that the stake pockets 12 may vary somewhat in distance from the end of the flat car the member 60 may be adjusted in relationship to the bracket 66 by moving the bolt 62 along the opening 64, when the toe board is to be rested to the vertical position, toggle lever 70 is moved to the left until it reaches rest 84 and then may be held in place by spring lock pin 82 or any other suitable locking means. Bolt 54 of the hold down member 50 is employed to assist in holding the frame member 66 in place.

It is to be understood that the hold down means may be a chain, band or other suitable device. In Figure 9 is shown a hold down chain which is to be attached to the corner of highway vehicles such as trailers. This chain 89 consists of a suitable hook 86 and has a spring 88 mounted in the chain between the hook 86 and the hold down device 50.

In Figure 10 the lifting device for trailers and the like is secured in the pocket 12 of the flat car by means of a member 92 passing through a pocket and is held in position by removable member 94. The lifting device may be of any suitable kind of jack, the type shown or it may be a hydraulic type with a suitable hydraulic system for raising one or more of the jacks at the same time. The type shown in Figure 10 is manually operated and the member 96 is raised step by step by member 106 which is pivotally mounted at 108. Attached to fulcrum member 96 which has pivotally connected thereto support surface member 100, rod 102 passes through support member 100 and the member 98 has notch 109 that engages the rod 102 when in operating position shown in Figure 11. The upper end of member 98 acts as a stop for vehicles supported by member 100. Member 100 has an elongated opening 106 through which rod 104 passes. The rod 104 is mounted on member 98. Member 100 may be provided with an opening 110 to which the attached cable 112 passes over the suitable pulley 114. In this arrangement the cable passes over the merchandise to be held down and with the raising of the jack and/or the member 100 the cable is tightened over the merchandise to be held down. The hold down device associated with the jacks are preferably of the kind shown in Figures 6 and 7 but the bolt 54 may be provided with a ring 45 at its upper end to which the hold down chain 89 is attached.

It is to be understood that automotive vehicles can be transported on the flat cars and other merchandise may be held in place on the flat car's return trip without any modification of the flat car floor surface.

In Figure 13 is shown deck conveyance with a standard rub rail 14 on which wheeled vehicles conveyances are positioned. The flat deck conveyances may be a landing craft, ferry or the like. In case of a landing barge it may be desirable to drive the highway conveyance onto the deck and to remove them by a winch and cable 118. In Figure 13 the winch and cable are shown at both ends but it is to be understood that they may be needed only at one end. The flat deck conveyance shown in Figure 13 is to be provided with suitable lifting jacks and hold down devices which are to be positioned along the rub rail 14.

In the specifications and claims hold down cable or hold down cable means is intended to mean band, strap, chain, cable, etc.

Figure 4:
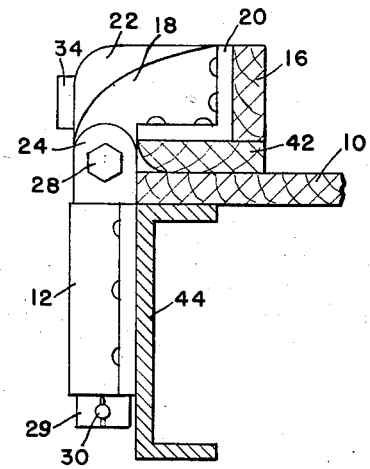
Figure 4 is a side elevational view with portions broken away of a hold down device mounted in the stake pocket of a flat car.
Figure 5:
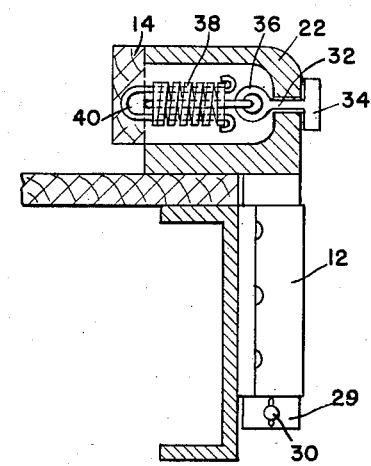
Figure 5 is a sectional view through a hold down device of the type shown in Figure 4.

In hauling trailers and the like the jacks with their associated hold down means may be employed but generally when automobiles are to be hauled on a flat car the hold down means shown in Figures 3 through 5 may be employed. The hold down means shown in Figures 3 through 5 may be used to hold down trailers as well as automobiles. The hold down chain 140 is attached to eye 40 of the hold down device and is secured across the flat car, the chain 140 passing through an eye of 40 of a hold down device positioned on opposed sides of the flat car. The automobile hold down chain 140 is provided with chain hook 142 that is passed through eye 40 and then secured to the chain. There may be placed in chain 140 a tightening means 144. The tightening means includes bar 146, lever 148 and connecting link 150. At least two hold down means and one hold down chain 140 are used with each automobile to be transported on a flat deck conveyance. The chains 140 are secured to the automobile in any suitable manner, as for example, hooks 152.

The jacks may be hydraulically operated and of the kind shown in Figure 15. The supporting member 100 is pivotally connected to member 96 at 154. Rod or link 156 is connected to the support member 100 at 158 and to jack base at 160. When the jacks are raised the supporting surface 100 is brought to the horizontal position through the action of link 156.

What is claimed:

1. In combination with the railway car having a load receiving surface for transporting vehicles; vehicles on said load receiving surface; stake pockets along the sides of the railroad car; means for securing said vehicles to said railway car against relative movement therebetween when in transit, which comprises substantially vertically extending lifting jacks, each of said jacks having a base and a post depending from said base, said post removably secured in a stake pocket of said railway car; a hold down pocket attached to the railway car and associated with each of said jacks; cable attaching means mounted in each of said hold down pockets; and a cable attached to said cable attaching means and to the vehicles, said jacks assisting in supporting said vehicles during transit.

2. In combination with a railway car having a load receiving surface for transporting wheeled vehicles from point to point, wheeled vehicles on said load receiving surface, stake pockets along the sides of the railway car, means for securing said wheeled vehicles to said railway car, which comprises four lifting jacks for each wheeled vehicle, said jacks secured in stake pockets of the said railway car, one of said lifting jacks adjacent each corner of said wheeled vehicles and assisting in supporting the vehicles during transit, a hold down pocket attached to a stake pocket of the railway car and associated with each of said jacks, cable attaching means connected to said hold down pockets, hold down cables, said cables attached to the vehicles and to the cable attaching means whereby the cables are tightened upon raising of the jacks.

3. In combination with a carrier vehicle having a load supporting floor for transporting at least one wheeled vehicle, a wheeled vehicle, stake pockets positioned along the sides of the carrier vehicle, jacks removably secured in selected stake pockets of the carrier vehicle and assisting in supporting said wheeled vehicle during transit, hold down cables attached to the jacks and to the wheeled vehicle whereby the cables are tightened upon the raising of the jacks to support the wheeled vehicle.

4. In combination with a railroad car, stake pockets positioned along the sides thereof, a vehicle carried by the railroad car, lifting jacks secured to selective stake pockets and assisting in supporting the vehicle during transit, hold down cables, hold down cable attaching means secured to the railroad car and associated with the jacks, said hold down cables attached to the vehicle and to said cable attaching means.

References Cited in the file of this patent

UNITED STATES PATENTS

| | | |
|---|---|---|
| 1,261,497 | Drew | Apr. 2, 1918 |
| 1,770,798 | Nicholson | July 15, 1930 |
| 2,118,364 | Sheehan | May 24, 1938 |
| 2,128,667 | Atherton | Aug. 30, 1938 |
| 2,159,479 | Goodwin et al. | May 23, 1939 |